E. A. WOODWARD.
SAFETY VALVE FOR PNEUMATIC TIRES.
APPLICATION FILED JULY 9, 1913.

1,116,528. Patented Nov. 10, 1914.

Witnesses
Oscar V. Payne
V. J. Dowrick

Inventor
E. A. Woodward
By Watson E. Coleman
Attorney

UNITED STATES PATENT OFFICE.

ERNEST A. WOODWARD, OF SACRAMENTO, CALIFORNIA.

SAFETY-VALVE FOR PNEUMATIC TIRES.

1,116,528.  Specification of Letters Patent.  Patented Nov. 10, 1914.

Application filed July 9, 1913.  Serial No. 778,154.

*To all whom it may concern:*

Be it known that I, ERNEST A. WOODWARD, a citizen of the United States, residing at Sacramento, in the county of Sacramento and State of California, have invented certain new and useful Improvements in Safety-Valves for Pneumatic Tires, of which the following is a specification, reference being had to the accompanying drawings.

This invention relates to new and useful improvements in safety valves for pneumatic tires which can be conveniently applied to any well known form of pneumatic tires in lieu of the present check valve.

One of the common causes for the blowing up of pneumatic tires on automobiles is that the air in the tire becomes heated from one cause or another, thereby producing a sufficient excessive pressure within the tire to burst the latter. After a pnuematic tire, as now commonly made, has been pumped up and has been disconnected from the pump, there is no way of ascertaining the amount of pressure within the tire or of automatically relieving any excessive pressure which may be produced within the tire by the heating of the air therein, as a result it frequently happens that a motorist suddenly finds his tire has blown out.

The object of my invention is to provide a novel safety valve for pneumatic tires which includes in its construction not only the ordinary check valve which is used to prevent the escape of the air but which also includes a safety valve that is adapted to operate automatically that relieves any excessive pressure which may be generated or put within the tire. The safety valve is so constructed that it does not interfere at all with the ordinary operation of the tire, but if the pressure within the tire becomes excessive, said safety valve opens automatically to relieve the pressure.

A further object of the present invention is the provision of a safety valve of the above character which will possess advantages in points of efficiency and durability, is inexpensive to manufacture and at the same time is simple in construction and operation.

With the above and other objects in view, this invention consists in the novel features of construction and the combination and arrangement of parts to be hereinafter more fully described, pointed out in the claims and shown in the accompanying drawings, in which—

Figure 1:
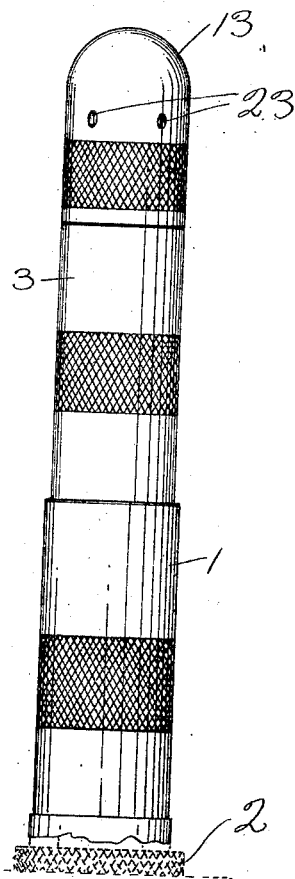
Figure 2:
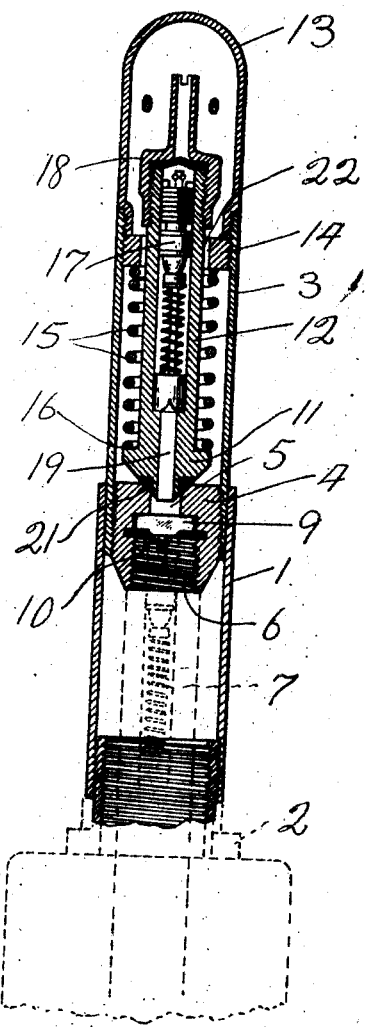
Figure 3:

Figure 1 is a side elevation of a safety valve constructed in accordance with my invention; Fig. 2 is a vertical sectional view; Fig. 3 is a view in perspective, detached, of the bridge plate employed in connection with my invention, as herein desclosed.

Referring more particularly to the drawings, 1 indicates the body casing which is tubular in cross section and having its lower end removably engaged with the outer surface of the tire nut 2 so that the body casing and the removable casing 3 may be quickly and readily applied to any well known form of automobile tire valve. The lower end of the casing 3 is arranged within the upper end of the body casing 1 and is provided with a bushing 4 having a central opening 5 formed therein and which is adapted to communicate with a central reduced portion 6, adapted to receive the upper end of the check valve 7, said check valve being provided upon its outer periphery with the usual well known screw threads whereby the bushing 4 will be quickly and readily engaged with the upper end of the tire valve. From this it will be seen that the casing 3 and its contents may be quickly and readily applied to the body member 1 and also engaged with the inner valve member 7. The bushing 4 is provided at its central portion with a bridge member 9, the intermediate portion of which is adapted to engage the upper end of the check valve rod 7 to normally hold the check valve in an open position.

A rubber packing ring 10 is provided which is adapted to be arranged beneath the outer edge of the bridge 9 to provide an air tight joint between the upper end of the valve stem 7 and the bushing 4. Arranged within the casing 3 and movable with respect thereto, is a valve member 11 having a tubular stem 12 formed integral therewith and projecting upwardly beyond the upper end of the casing, a movable cap 13 being engaged over the upper end of the casing to entirely close the upper end of the tube. Removably arranged within the upper end of the casing 3 is an adjusting nut 14 which forms a suitable guide for the stem 12 and at the same time provides a bearing for the upper end of the coil spring 15, said coil spring being arranged between the nut 14 and the flange portion 16 of the valve 11 so as to normally retain the valve 11 in its closed position.

Arranged within the stem 12 is the ordinary check valve 17 and removably arranged upon the upper end of the stem is a cap 18 which may be quickly and readily removed to allow the tire to be inflated and can be readily replaced thereon. The tempering valve member 11 is provided adjacent its lower end and encircling the central bore 19 with a groove 20 in which is arranged an annular packing ring 21 adapted to frictionally engage the valve seat formed at the upper end of the opening 5 and the bushing 4 to provide an air tight joint when the valve is in its closed position.

The adjusting nut 14 is provided adjacent its central opening with a plurality of openings 22 which are adapted to communicate with the interior of the casing 3 and with the opening 5 when the valve 11 is in a raised position, so that when the air pressure in the tire becomes excessive, it will readily pass out through the openings 5 and 22 and through the openings 23 formed in the cap 13.

From the above description taken in connection with the accompanying drawings, it will be readily apparent that the tire may be inflated through the check valve 12 and the open check valve 7, the valve 12 closing after the tire has been inflated to the desired extent. Should the pressure of the air in the tire become excessive, the air will pass upwardly through the openings 5 and 6 and bear against the lower end of the valve member 11, the coil spring 15, the pressure of which has been adjusted by means of the nut 14, will be compressed permitting upward movement of the valve 11 and allowing the air to escape into the casing 3 from whence it passes upwardly through the openings 22 into the cap 13 where it passes out through the suitable openings 23. From this it will be seen that the nut 14 may be adjusted according to the pressure desired within the tire so that the pressure within the tire may be quickly and readily relieved through my improved safety valve after the machine has been running considerable distance. It will also be apparent that the device may be quickly and readily applied to the well known type of pneumatic tire valves and can be readily removed therefrom, when desired. It will also be apparent that the device is extremely simple in construction and can be manufactured at a comparatively low cost.

While I have shown and described the preferred form of my invention, it will be obvious that various changes in the details of construction and in the proportions may be resorted to for successfully carrying my invention into practice without sacrificing any of the novel features or departing from the scope of the appended claim.

What I claim is:—

The combination with a tire valve, of a safety valve including a bushing serving as a seat for the valve, said bushing being provided with a recess adapted to receive the free end of the tire valve casing, a bridge plate disposed within the recess of the bushing provided with a projected portion adapted to extend within the casing of the tire valve to maintain such tire valve in open position, the end edges of such bridge plate being straight and unobstructed whereby the plate is freely insertible within the recess of the bushing, and a gasket fixedly carried by the bushing and projecting within the recess thereof to hold the bridge plate against displacement and to assure proper joint between such bushing and the casing of the tire valve.

In testimony whereof I hereunto affix my signature in the presence of two witnesses.

ERNEST A. WOODWARD.

Witnesses:
 JAS. H. DONNELLY,
 CHAS. H. EWERS.